United States Patent [19]
Kanada et al.

[11] Patent Number: 5,473,669
[45] Date of Patent: Dec. 5, 1995

[54] METHOD FOR CONTROLLING A MOBILE IVD SYSTEM HAVING A PLURALITY OF PERSONAL STATIONS (PSS)

[75] Inventors: Yoshihisa Kanada, Tokyo; Yoshihiko Terashita, Yamato; Masaaki Kasuya, Tokyo; Yukari Katoh, Sagamihara, all of Japan

[73] Assignee: International Business Machines Corporation, Armonk, N.Y.

[21] Appl. No.: 291,221

[22] Filed: Aug. 16, 1994

[30] Foreign Application Priority Data

Sep. 30, 1993 [JP] Japan ................................ 5-244580

[51] Int. Cl.$^6$ ........................................... H04Q 7/22
[52] U.S. Cl. ........................... 379/59; 379/58; 455/33.1
[58] Field of Search ............................ 379/58, 59, 60, 379/61, 63, 219, 225; 455/33.1, 54.1; 370/77, 85.1, 85.5, 85.9

[56] References Cited

U.S. PATENT DOCUMENTS

| | | | |
|---|---|---|---|
| 4,807,222 | 2/1989 | Amitay | 370/85.9 |
| 5,115,463 | 5/1992 | Moldavsky | 379/58 |
| 5,212,806 | 5/1993 | Notarajan | 379/60 X |

Primary Examiner—Curtis Kuntz
Assistant Examiner—Michael B. Chernoff
Attorney, Agent, or Firm—Stephen T. Keohane

[57] ABSTRACT

A system and method enables the reception of signals on a moving Personal Station (PS) within an Integrated Voice and Data (IVD) system which integrates sound and data, and comprises an available PBX and LAN. A first Cell Station (CS) registers the LAN identifier of a first PS that is positioned within its own radio cell, and assigns a PBX telephone number to the first PS. Subsequently, calling information which includes a LAN identifier for a second PS and the PBX telephone number assigned to the first PS is broadcast via a LAN. Thereafter, a second CS which registers the LAN identifier of the second PS receives the calling information via a LAN and transfers the information of the second PS, or mobile station, via radio link. The second PS then dials the PBX telephone number included in the calling information. Thus, the link between the first PS and the second PS is connected when the first PS receives the call.

4 Claims, 6 Drawing Sheets

| PBX number | LAN network address | Radio calling number |
|---|---|---|
| #001 | #MAC 1 | #PSID 1 |
| #002 | #MAC 2 | #PSID 2 |
| #003 | #MAC 3 | #PSID 3 |
| ⋮ | ⋮ | ⋮ |

FIG. 4

| LAN header | LAN network address of addressed terminal | PBX number of demanding PS |
|---|---|---|

FIG. 5

| LAN header | LAN network address of a terminal on the other end | New PBX number |
|---|---|---|

METHOD FOR CONTROLLING A MOBILE IVD SYSTEM HAVING A PLURALITY OF PERSONAL STATIONS (PSS)

BACKGROUND OF THE INVENTION

1. Field of the Invention

The present invention relates to a local area network (LAN) and a communication network. More specifically, the invention relates to a method for controlling communication in a mobile Integrated Voice and Data (IVD) system, the system having a plurality of Cell Stations (CSs) interconnected through communication networks, including a LAN and a PBX telephone network, and Personal Stations (PSs) movable among a plurality of radio cells, each CS having a particular radio cell which defines a territory in which a PS is capable of communicating with the CS via a radio link. In particular, the invention relates to a method for controlling communication of the mobile IVD system having a plurality of PSs, wherein the method enables the sending of calls to PSs and also enabling automatic re-connection of a link even when the PS moves between radio cells during telephone calls and the link is disconnected.

2. Background of the Invention

A well-known PBX system comprises a plurality of PBX telephones interconnected with specifically used communication wires the inside of buildings, schools, and enterprises (or offices in enterprises). In addition, a recent development of radio technology has been promoting the development of mobile IVD systems in which the PBX telephone service is based on a physically separated form of CSs and PSs that can communicate via radio. The system allows users (subscribers) to actually exchange information with each other using PSs while the CS controls the communication link among the PSs.

The territory in which CSs are capable of communicating with PSs is restricted to a predetermined area due to the attenuation of radio waves as a result of the surrounding environment (a territory in which a CS is capable of communicating is generally called a radio cell). Each CS accommodates or services within its own radio cell one or more PSs. PBX telephone numbers of private links are assigned to each of the PSs which allow communication between the PSs.

On the other hand, PSs are not mechanically constrained and may move freely between a plurality of radio cells in accordance with the needs of the users. In addition, when mobile IVD systems are not capable of sending and receiving some information to or from PSs via CSs, the significance of the mobile IVD system will be decreased.

However, a conventional mobile IVD system must be substituted with a PBX having the following additional functions so that the system has a new link which enables constant reception of information with respect to PSs moving among a plurality of radio cells:

(a) a function for sending call signals to mobile terminals from all the CSs; and (b) a function for selecting the optimal CS to connect a link by a response from the PS to the call signals.

In addition, conventional mobile IVD systems require substitution to a PBX having the following additional functions to automatically switch over the communication circuit in order that the continuation of conversation be guaranteed to PSs moving between radio cells during communication.

(c) a function for monitoring the receiving level of electromagnetic waves from PSs and selecting the optimal CSs; and (d) a function for disconnecting the communication circuit whose receiving level has weakened in synchronization with the PSs.

However, substituting a PBX equipped with the above construction (a) to (d) for all the PBX telephone links in the mobile IVD system imposes a considerable cost burden as far as the users of the system are concerned. Furthermore, conventional PBX systems prevent users from enjoying the benefit of radio communication.

In this regard, the concept of the second generation cordless telephone, which is referred to as a digital cordless telephone, or PHP (personal handy phone) has recently been formulated. PHPs allow the simultaneous handling of communication by means of both voice and data signals through the digitization of voice and data signals. Technological specifications for the interface between general-purpose radio segments has been standardized on the part of RCR (R & D Center for Radio Systems) between the PHP terminal and CS. PHP can simultaneously handle both voice and data with the digitization thereof via the interface between radio segments.

The second generation cordless telephone system satisfies the following items as basic functions:

(a) Digitization of system

The quality of cordless telephone system shall be able to be secured to a level more than equal to the counterpart conventional analog type cordless telephone system, the secrecy of conversation on the phone can be improved and the frequency bandwidth can be effectively used.

(b) Interconnection

PSs shall be capable of basic connection with CSs at various places such as offices, homes, and outdoor areas.

In addition, when there arises a situation in which PSs already used for homes and offices must be connected to outdoor public CSs, the PS can be easily shared through the execution of necessary measures.

(c) Connection with communication network

The second generation cordless telephone system shall be able to be connected with the established analog telephone network and ISDN digital network.

(d) In addition to service that has been used in conventional cordless telephone systems, various services can be utilized through the services provided by ISDN.

OBJECTS OF THE INVENTION

Therefore, an object of the present invention is to provide a method for controlling a mobile IVD system having a plurality of PSs that enables moving PSs to receive signals by introducing PHP terminals within the mobile IVD system comprising an available PBX and LAN so as to provide communication with integrated voice and data.

In addition, another object of the invention is to provide a method for controlling a mobile IVD system having a plurality of PSs that automatically reconnects a communication link upon the movement of a PS between radio cells so that the link is disconnected, by introducing of PHP terminals into the mobile IVD system comprising an available PBX and LAN so as to perform communication with integrated voice and data.

SUMMARY OF THE INVENTION

The present invention has been made in view of the above points to provide a method for controlling a mobile Integrated Voice and Data (IVD) system. The system has a plurality of Cell Stations (CSs) interconnected through both LAN and PBX telephone networks and a plurality of Personal Stations (PSs) movable among a plurality of radio cells. The PSs are capable of communicating with a CS which manages the PSs through radio links. Each CS manages a plurality of PBX telephone numbers. It has a particular radio cell which defines a territory in which it is capable of communicating through radio links, and registers the LAN identifiers of the plurality of PSs which are in its territory, and assigns one of the PBX telephone numbers to each of them respectively. The method includes steps as follows:

(a) in response to a first PS moving into a territory of a first CS, registering the LAN identifier of the first PS and assigning a PBX number to the first PS by the first CS;

(b) sending calling information including the LAN identifier of the second PS and the first PSs newly assigned PBX telephone number to said first CS via radio links by the first PS;

(c) broadcasting the calling information from the first CS to all the other CSs via the LAN by the first CS;

(d) in response to a second CS which registers the second PS receiving the calling information, resending it to the second PS via radio links by the second CS;

(e) dialing the PBX telephone number stored in the calling information by the second PS; and (f) calling the first PS via a PBX link in response to dialing step (e) and establishing a PBX telephone link between the first and second PSs.

In addition, the present invention also provides a method for controlling a mobile Integrated Voice and Data (IVD) system as follows. The system also has a plurality of Cell Stations (CSs) interconnected through both LAN and PBX telephone networks and a plurality of Personal Stations (PSs) movable among a plurality of radio cells. The PSs are capable of communicating with a CS which manages the PSs through radio links. Each PS has a particular LAN identifier, and maintains the LAN identifier of the counterpart PS. Each CS manages a plurality of PBX telephone numbers, and has a particular radio cell which is defined by a territory within its radio communicating range, and disconnects a communication link if a reception level of radio waves received from its corresponding PSs falls to or below a predetermined threshold value, and monitors of the reception levels during transmission and registers the LAN identifiers of the plurality of PSs which are in its territory, and assigns one of the PBX telephone numbers to each of them respectively. The method includes steps as follows:

(a) establishing the communication link between a first PS within a radio cell of a first CS and a second PS within a radio cell of a second CS;

(b) instantly disconnecting the communication link if the first PS moves beyond the radio cell of the first CS and the reception level of radio waves received by the first CS from the first PS falls to or below the predetermined threshold value;

(c) registering the LAN identifier of the first PS in a third CS, and simultaneously assigning a PBX telephone number to the first PS when the first PS moves to the radio cell of the third CS;

(d) sending by the first PS of moving information having the LAN identifier of the second PS and the newly assigned PBX telephone number through radio links to the third CS;

(e) sending by the third CS of the sent moving information via the LAN to the second CS;

(f) sending by the second CS of the sent moving information by radio signal to the second PS;

(g) dialing by the second PS of the PBX telephone number identified in the sent moving information; and (h) calling the first PS in response to the dialing step, and then re-establishing the PBX telephone link between the first PS and the second PS in response to the calling.

In accordance with the present invention, a first PS, which is the source of the demand for communication with a second PS, broadcasts to all the CSs the LAN identifier (LAN network address) of an addressed second PS and calling information (called packet) including its PBX telephone number through LAN via a first CS.

Thereafter, the second CS which registers LAN identifiers receives and sends the calling information to its corresponding PSs via radio links. When the second PS dials the PBX telephone number included in the calling information and the first PS responds to the calling, the communication link between two PSs is established.

In this way, signals can be received by all the PSs in the IVD system.

Furthermore, in accordance with present invention, the first PS that has been moved out of the initial radio cell sends to a second CS by using LAN, a LAN identifier of an addressed second PS and information indicating the movement including its newly assigned PBX telephone number. Then, the second CS sends the information indicating the movement of the first PS to the second PS by radio. The second PS dials the PBX telephone number included in the information indicating the movement thereof. When the first PS responds to the call, the communication link between two PSs is reestablished or reconnected.

Therefore, even when the communication link is disconnected along with the movement of one of the PSs, the link can be automatically re-established or reconnected.

DESCRIPTION OF THE SYMBOLS

11—telephone (PBX) network
12—LAN circuit
15—PBX telephone network

20—cell station (CS)
21—radio cell
22—controller for the transmission and reception
23—communication controller
24—telephone network controller
25—LAN controller
30—personal station (PS)
31—handset
32—data communication port
33—portable terminal
34—controller for the transmission and reception
35—communication controller

DETAILED DESCRIPTION OF THE EMBODIMENT

Embodiments of the present invention will be described in detail hereinafter in conjunction with the drawings.

Figure 1:
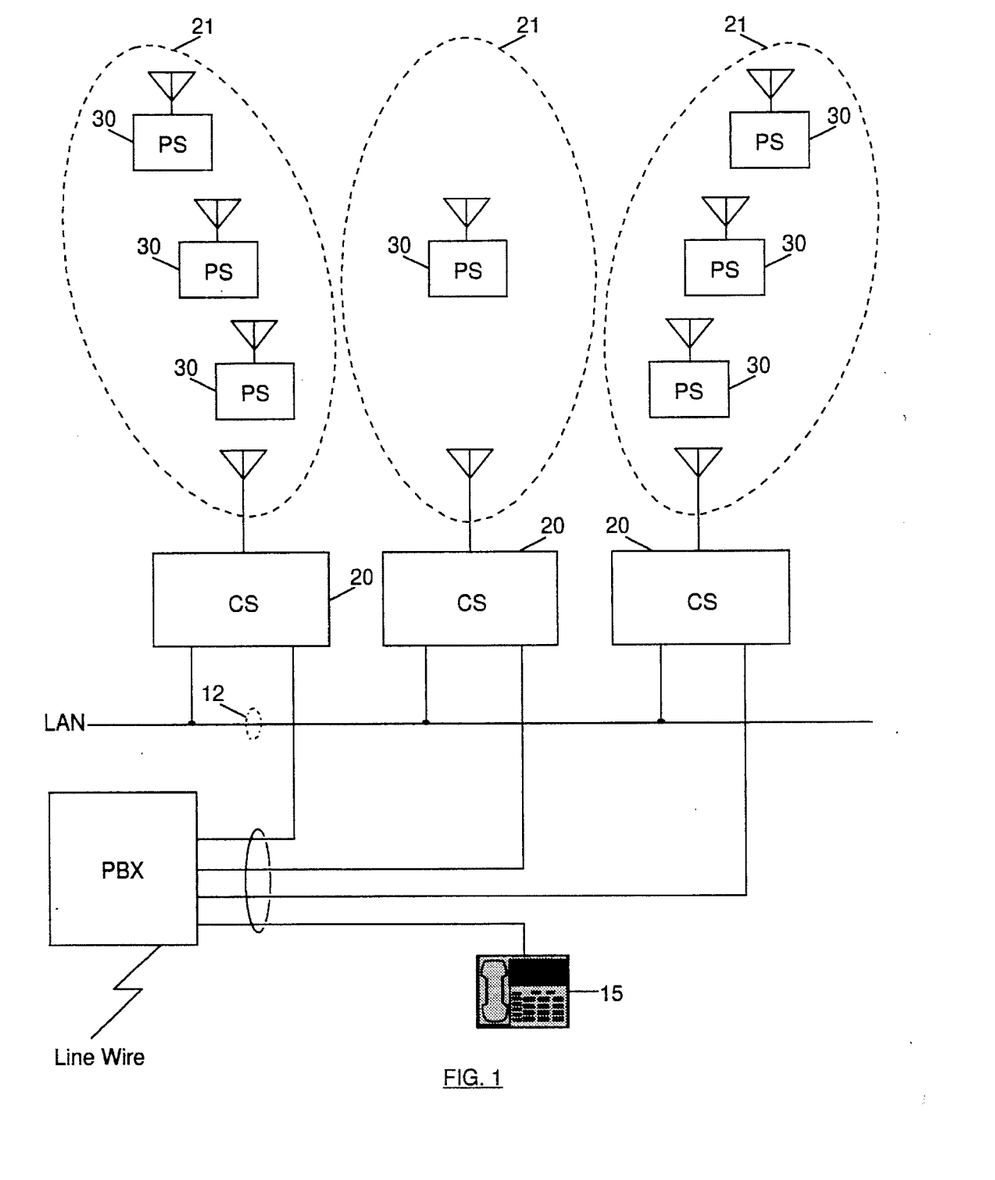
FIG. 1 is a block diagram showing the IVD system provided by the embodiment of the present invention.

FIG. 1 is a block diagram showing the general construction of an IVD system to which an embodiment of the present invention is applied. The IVD system comprises a network upper layer using PBX telephone network facilities and LAN facilities as communication media and a network lower layer using radio links as a communication medium.

The network upper layer provides a telephone network (11) extended from a PBX, a LAN (12), and one or more cell stations (CSs) (20) connected to both PBX (11) and LAN (12). Furthermore, for each CS (20), a radio cell (21), that is an area where radio waves can be received, is defined. Radio cells are normally distributed and arranged in buildings, schools, enterprises (or offices of enterprises), or outdoors.

Furthermore, the network lower layer comprises the above CS (20), and one or more personal stations (PSs) (30) which can perform communication with the CS (20) by radio links. The territory where each CS (20) can service or accommodate PSs is limited to its own radio cell (21) due to the attenuation of radio waves.

The connection between PBX telephone network and LAN facilities is shown as a bus type, but the connection is not limited thereto. It may be of a star type or a loop type.

Figure 2:
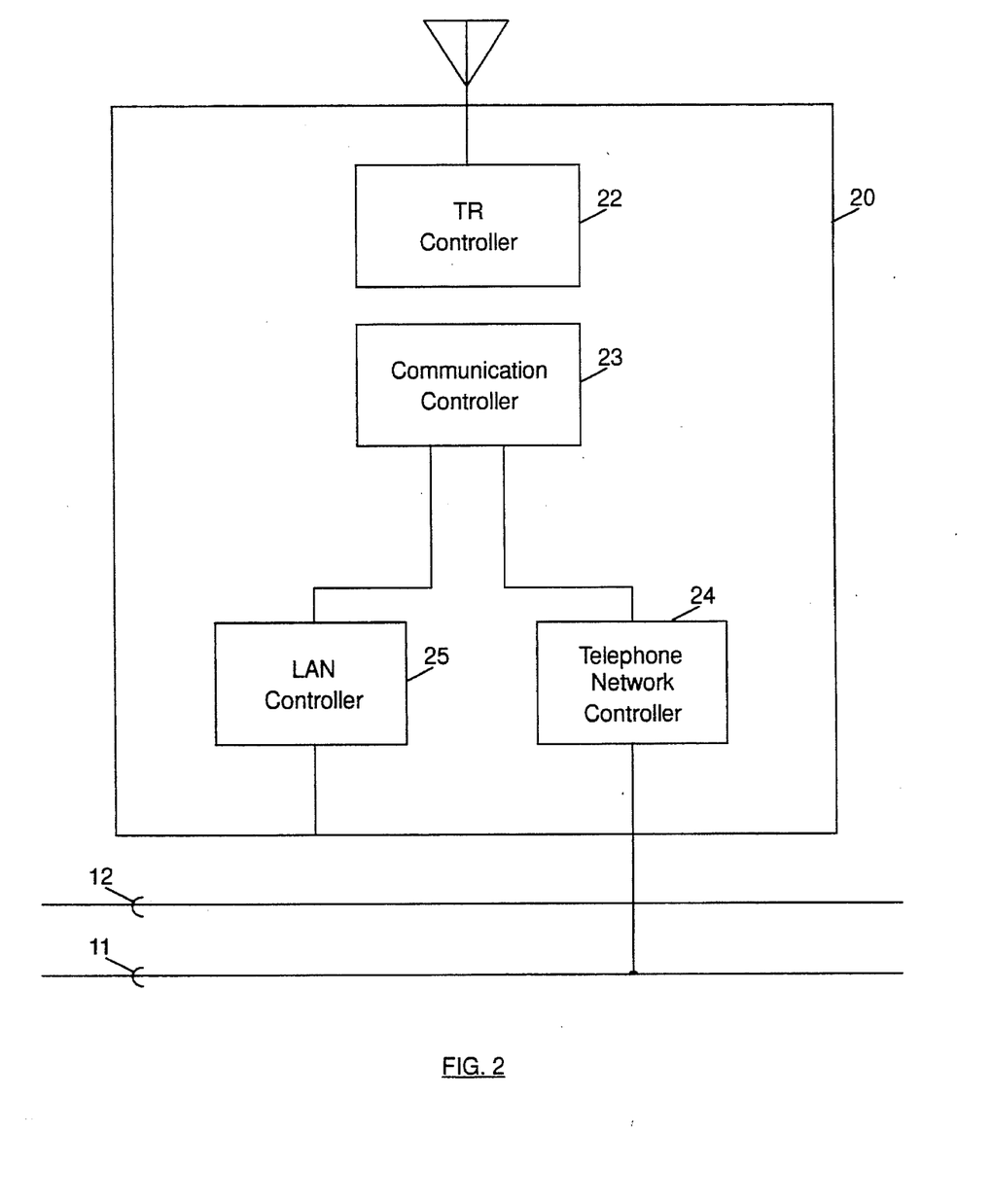
FIG. 2 is a block diagram showing the construction of the major part of the CS (20) included in the IVD system.

FIG. 2 is a block diagram showing the construction of a major portion of the CS (20). The function of each block will be detailed hereinafter.

The block designated by Reference Numeral 22 is a controller for the transmission and reception. The controller has a function of receiving a digital signal comprising integrated information from the PBX telephone network (11) and the LAN (12) and converting the digital data into a radio signal. It further has the function of receiving a radio signal so as to convert the same signal into digital data. Furthermore, the controller (22) can monitor the reception level of radio signals received from a PS (30) within its radio cell.

The block shown by Reference Numeral 23 is a communication controller having a function of integrating voice (from PBX network 11) and data (from LAN 12) into a single digitized data format. It further has the function of receiving a digital signal from block 22 comprising integrated information and for branching the data to the telephone network (11) (voice) and the LAN (12) (data) as required. Furthermore, the communication controller (23) controls communication between PSs in radio cells of the CSs, communication with CSs other than the CS (20) and communication with the other telephone (15) connected to the telephone network (11). The communication controller (23) disconnects this communication link when the reception level of radio wave from the communicating PS (30) falls to or below the threshold value. The threshold value is set in advance to a value corresponding to the reception level when the PS has moved out of the own radio cell of the CS.

The block designated by Reference Numeral 24 is a controller of the telephone network which is connected with the telephone network (11) to control the link connection on the side of the PBX. The PBX preliminarily provides each CS (20) with a plurality of PBX telephone numbers for conversation through the telephone network (11). The telephone network controller (24) responds only to the demand for conversation to connect the link.

The block designated by Reference Numeral 25 is a LAN controller which is connected to the LAN (12) in order to control the link connection on the LAN side. From time to time, the LAN controller (25) receives a "calling packet" and/or a "movement notification packet" via the LAN from a PS accommodated in another radio cell.

Figure 4:
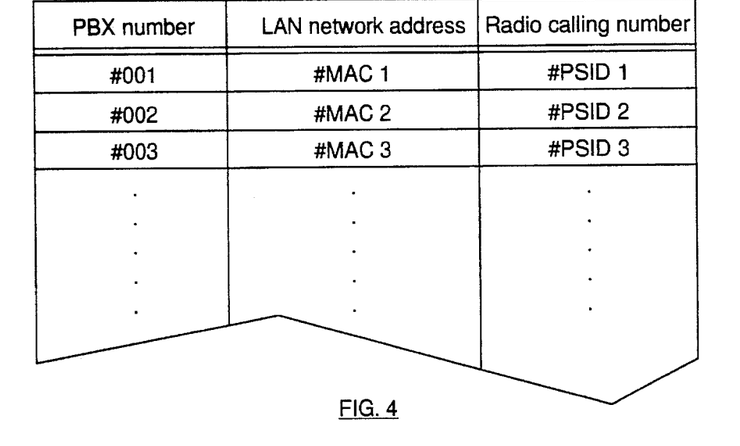
FIG. 4 is a view showing an example of the control table within the radio cell included in the CS (20)

The operation for establishing a radio link between the CS (20) and the PS (30) where the CS (20) services or accommodates the PS (30) is actualized with the communication control function provided as a normal standard established by the RCR. Details thereof are omitted here. When the position of a certain PS (30) is registered with regard to a specified CS (20), the LAN network address of a portable terminal (which will be mentioned later) connected to itself is sent. The CS (20) comes to control the LAN network addresses related with all the PSs (30) located within its own radio cell (21). Moreover, the CS (20) assigns one of the PBX telephone numbers assigned to it by the PBX to each PS (30). Each CS (20) maintains control tables to clearly control such LAN network addresses and PBX telephone numbers of the PSs within the radio cell. FIG. 4 shows one example of a control table of those PSs within the radio cell. The table clearly shows each PS (30) is provided with a LAN network address, "# MAC1", "# MAC2" and "# MAC3", and is registered, PBX telephone numbers "# 001", "# 002" and "# 003" are respectively assigned to each PS, and radio calling numbers "# PSID1", "# PSID2", and "PSID3" are respectively assigned to each PS (30) for communicating with the CS (20).

Furthermore, each CS (20) is provided with LAN network address for identifying individual calls within a wide area LAN.

Figure 3:
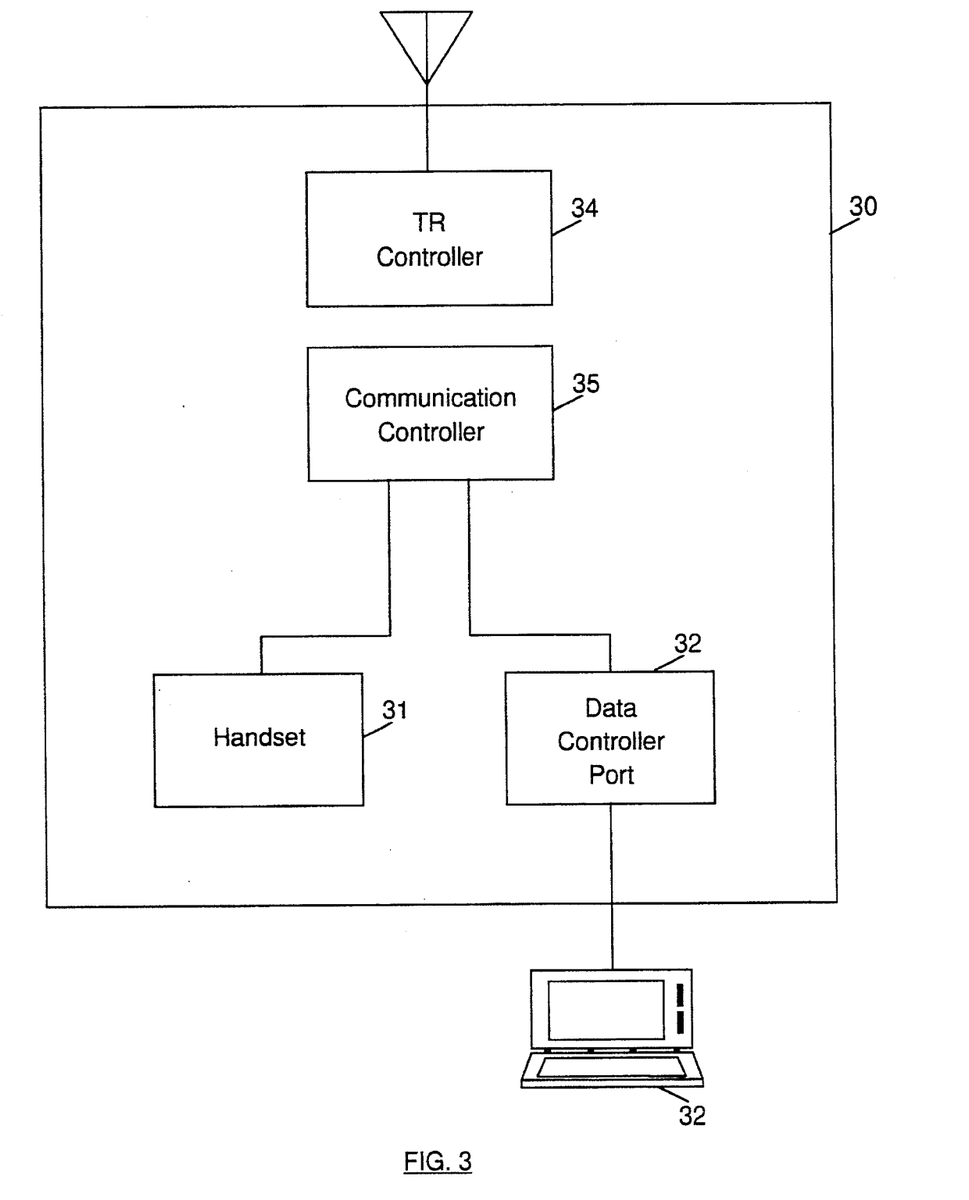
FIG. 3 is a block diagram showing the construction of the major part of the PS included in the IVD system.

FIG. 3 is a block diagram showing the construction of the major part of the PS (30). The function of each block will be detailed hereinbelow.

The block designated by Reference Numeral 31 provides the function of a conventional telephone in that it is a handset providing a conversation function mutually converting voice and symbols so as to enable users (subscribers) to talk on the phone, and a dialing function for designating the telephone number of the person on the other end of the phone. The telephone can have the same construction as a subsidiary device of the conventional cordless telephone.

The block designated by Reference Numeral 32 is a data communication port. The PS (30), to be provided as a communication terminal apparatus to subscribers, is connected with a portable terminal (33) via the data communication port (32). A personal computer is used as the portable terminal (33). Users can enter communication data through the keyboard. In addition, each portable terminal (33) is provided with a LAN network address for identifying individual calls within a wide area LAN.

The block designated by Reference Numeral 34 is a controller for the transmission and reception. The controller provides the function of receiving digitized data comprising integrated voice and data and converting the data into a radio wave signal and the function of receiving radio wave signals so as to convert the data represented by the radio wave signals into digitized data.

The block designated by Reference Numeral 35 is a communication controller which integrates voice signal sent from the handset (31) with a signal from a data communication port (32) in order to send it to the controller (34). It further has the function of dividing a signal sent from the controller (34) into voice and data. The communication controller (35) provides a position registration function for establishing a radio link with a specific CS (20). Since the position registration function is incorporated as a normal standard, it is not shown here. However, it is to be noted that the LAN network address of the portable terminal connected to the PS (30) is indicated to the CS (20) in which the PS (30) is accommodated at the position registration.

Next, the operation of the IVD system will be detailed here.

A. Receiving signals at a moving PS

Figure 7:
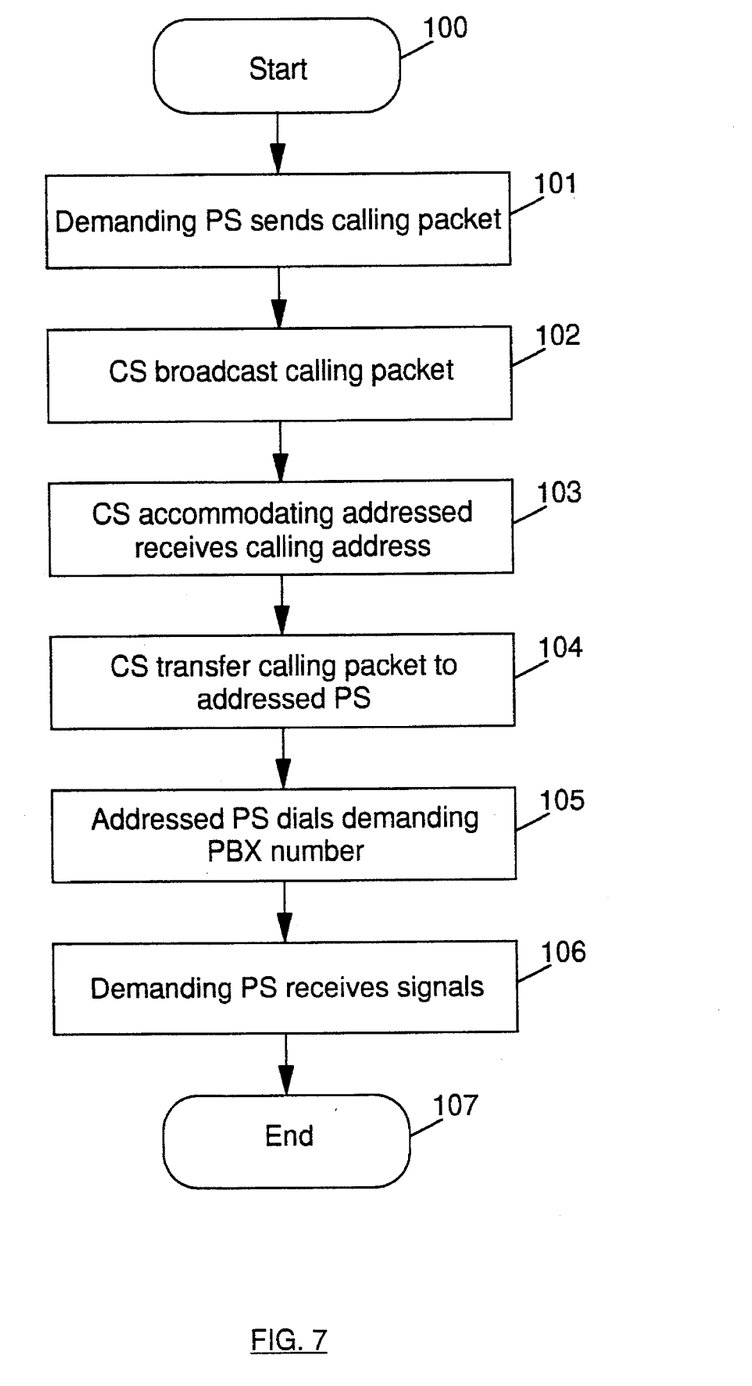
FIG. 7 is a view showing a flowchart for illustrating the reception of signals on the PS that moves between radio cells.

At the outset, the operation of receiving signals at the PS movable between radio cells will be detailed in conjunction with a flowchart shown in FIG. 7.

The operation is initiated at step designated by Reference Numeral 100.

Figure 5:
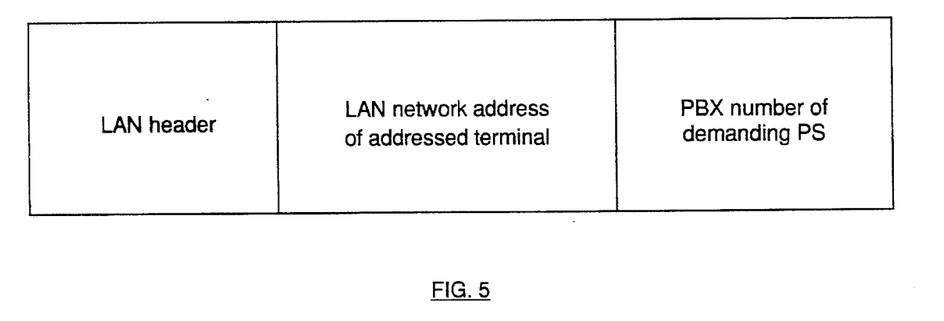
FIG. 5 is a view showing an example of a format of calling packet.

At step 101, the PS (30) which is the source of the call demand, sends the calling packet via radio link to the CS (20) servicing the source or demanding PS. The calling packet, shown in FIG. 5, includes, after a LAN header, the LAN network address assigned to the addressed portable terminal and the PBX telephone number assigned to the demanding PS (30).

Then, at step 102, the CS (20), which is the source of the demand, broadcasts this calling packet to other CSs (20').

The CS (20') accommodating or servicing the addressed PS (30') refers to its control table and examines the LAN network address field in the calling packet (step 103) in order to transfer this calling packet to the addressed PS (30') via radio (step 104).

At step 105, the addressed PS (30') takes out the PBX telephone number of the calling packet so as to dial the number.

At step 106, the PS (30), which is the source of the demand or calling packet, responds to calls to complete the connection of telephone network between both PSs.

Therefore, operations corresponding to steps 102 through 105 are automatically performed within the IVD system. Consequently, the demanding subscriber himself can make a PBX telephone call without recognizing by which CS the addressed subscriber is serviced or accommodated.

B. Reconnection upon the communicating PS being moved and the link being disconnected The operation for automatically reconnecting the telephone network upon the PS being moved between the radio cells and the link being disconnected will be explained with respect to the flowchart shown in FIG. 8.

Figure 8:
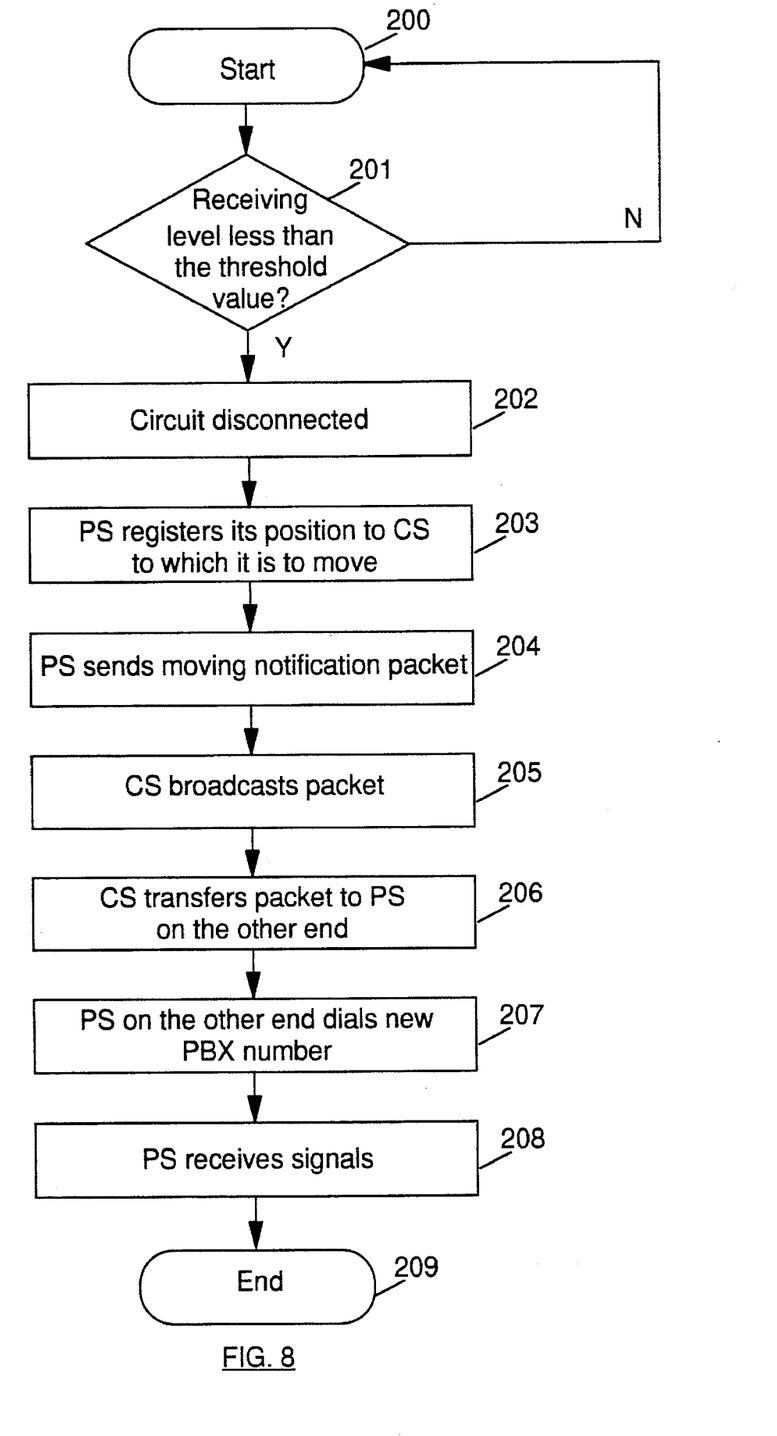
FIG. 8 is a view showing a flowchart for illustrating the automatic reconnection of the link when the link is disconnected by moving between radio cells in communication.

The operation will be initiated from step designated by Reference Numeral 200. Suppose that the PS (30) accommodated or serviced by the CS (20) and the PS (30") accommodated or serviced by the CS (20") are in the process of communication.

The CS (20) monitors the reception level of the radio wave received from the PS (30) during communication. In the determining block designated by Reference Numeral 201, the communication controller (23) within the CS (20) determines whether the reception level is less than the threshold value or not. When the PS (30) moves out of the area of the radio cell(21) and falls below the threshold value, the link is disconnected at step 202.

The PS (30) then moves into other radio cell (21'). At step 203, the PS (30) demands a new position registration to the CS (20'), thereby establishing a radio link between the CS (20') and the PS (30'). The CS (20'), in turn, assigns a new PBX telephone number to the PS (30).

Figure 6:
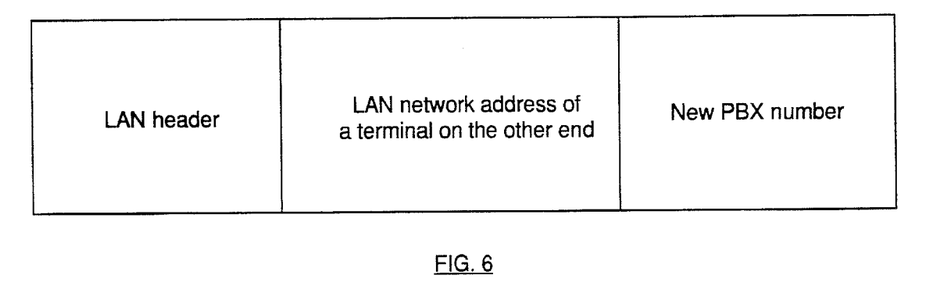
FIG. 6 is a view showing an example of the format of the movement notification packet.

When the position of PHP is registered, the radio calling symbol of the PHP is also sent to the CS (20'). The PS (30') senses from the change in the radio calling symbol that it has moved between radio cell (21) and (21'). Then at step 204, a movement notification packet is sent. The movement notification packet, whose format is shown in FIG. 6, comprises a LAN header, a LAN network address assigned to the portable terminal on the other side of the telephone, and the PBX number newly assigned to the PS (30).

At step 205, the CS (20') receives the movement notification packet and sends the packet to other CS (20).

At step 206, the CS (20") receives movement notification packet to send it to other PS (30") via radio link.

At step 207, the PS (30") removes the new assigned PBX telephone number of the PS (30) from the movement notification packet and dials it.

At step 208, the telephone network is reconnected between the two PS (30) and (30") by responding to a call thereby reconnecting the telephone network.

Therefore, the operation corresponding to steps 201 through 207 is automatically performed within the IVD system. Consequently, subscribers are movable freely within the system without being aware of whether or not the subscribers themselves have moved.

The present invention has been detailed by referring to a specific embodiment illustrated herein. However, the present invention is not limited thereto. Modifications and changes that can be easily made by those skilled in the art are allowed unless deviating from the spirit of the present invention.

ADVANTAGES OF THE INVENTION

As detailed above, the present invention can provide a system and method for controlling the IVD system having a plurality of PSs for connecting the plurality of PSs, for enabling some PSs to move within an IVD system which comprises an existing PBX and LAN to receive signals.

The present invention also provides a system and method for controlling an IVD system having a plurality of PSs for automatically reconnecting the communication link when the PS moves between the radio cells and the link is disconnected within the IVD system which comprises an available PBX and LAN.

In other words, the present invention can enjoy the largest benefit from the system at the minimum cost, thus yielding the greatest industrial effect.

What is claimed is:

1. A mobile Integrated Voice and Data (IVD) system, comprising:

a LAN and a PBX telephone network;

a plurality of Cell Stations (CSs) interconnected through both said LAN and said PBX telephone networks, each CS having a radio cell defined as the territory in which it is capable of radio communication;

a plurality of Personal Stations (PSs) movable among a plurality of radio cells, said PSs being capable of communicating with a CS which manages said PSs through radio links, each of said PSs having a particular LAN identifier, each of said CSs managing a plurality of PBX telephone numbers, each CS registering the LAN identifiers of said plurality of PSs which are positioned in its territory, and assigning one of said PBX telephone numbers to each PS respectively, said system further comprising:

(a) in response to a first PS moving into a territory of a first CS, means for registering said first PS's LAN identifier and assigning a PBX number to said first PS by said first CS;

(b) means for sending calling information including a second PS's LAN identifier and said first PSs newly assigned PBX telephone number to said first CS via radio links by said first PS;

(c) means for broadcasting said calling information from said first CS to all the other CSs via said LAN by said first CS;

(d) in response to a second CS which registers said second PS, means for receiving said calling information, and resending it to said second PS via radio links by said second CS;

(e) means for dialing the PBX telephone numbers stored in said calling information by said second PS; and (f) means for calling said first PS via a PBX link in response to dialing step (e) and connecting a PBX telephone link between said first and second PSs.

2. A system for controlling a mobile Integrated Voice and Data (IVD) system, said system having a plurality of Cell Stations (CSs) interconnected through both LAN and PBX telephone networks and a plurality of Personal Stations (PSs) movable among a plurality of radio cells, said PSs being capable of communicating with a CS which manages the PSs through radio links, each of said PSs having a particular LAN identifier, and maintaining the LAN identifier of the counterpart PS, each of said CSs managing a plurality of PBX telephone numbers, having a particular radio cell which defines a territory in which it is capable of communicating through radio links, monitoring the reception levels of communication links during transmission, disconnecting a communication link if a reception level of radio waves falls to or below a predetermined threshold value, registering the LAN identifiers of said plurality of PSs which are positioned in its territory, and assigning one of said PBX telephone numbers to each of them respectively, said system comprising:

(a) means for connecting the communication link between a first PS within a radio cell of a first CS and a second PS within a radio cell of a second CS, (b) means for instantly disconnecting said communication link if the first PS moves beyond the radio cell of the first CS and the reception level of radio waves falls to or below said predetermined threshold value, (c) means for registering the LAN identifier of the first PS in a third CS, and simultaneously newly assigning a PBX telephone number to the first PS when the first PS moves to the radio cell of the third CS, (d) means for sending by the first PS of moving information having the LAN identifier of the second PS and said newly assigned PBX telephone number through radio links to the third CS, (e) means for sending by the third CS of said sent moving information via the LAN to the second CS, (f) means for sending by the second CS of said sent moving information by radio signal to the second PS, (g) means for dialing by the second PS of the PBX telephone number within said sent moving information, and (h) means for calling the first PS in response to said dialing step, and then reconnecting the PBX telephone link between the first PS and the second PS in response to said calling.

3. A method for controlling a mobile Integrated Voice and Data (IVD) system, said system having a plurality of Cell Stations (CSs) interconnected through both LAN and PBX telephone networks and a plurality of Personal Stations (PSs) movable among a plurality of radio cells, said PSs being capable of communicating with a CS which manages the PSs through radio links, each of said PSs having a particular LAN identifier, each of said CSs managing a plurality of PBX telephone numbers, having a particular radio cell which defines a territory in which it is capable of communicating through radio links, registering the LAN identifiers of said plurality of PSs which are positioned in its territory, and assigning one of said PBX telephone numbers to each of them respectively, said method comprising the steps of:

(a) in response to a first PS moving into a territory of a first CS, registering said first PS's LAN identifier and assigning a PBX number to said first PS by said first CS;

(b) sending calling information including a second PS's LAN identifier and said first PS's newly assigned PBX telephone number to said first CS via radio links by said first PS;

(c) broadcasting said calling information from said first CS to all other CSs via said LAN by said first CS;

(d) in response to a second CS which registers said second PS receiving said calling information, resending it to said second PS via radio links by said second CS;

(e) dialing the PBX telephone numbers stored in said calling information by said second PS; and (f) calling said first PS via a PBX link in response to dialing step (e) and connecting a PBX telephone link between said first and second PSs.

4. A method for controlling a mobile Integrated Voice and Data (VD) system, said system having a plurality of Cell Stations (CSs) interconnected through both LAN and PBX telephone networks and a plurality of Personal Stations (PSs) movable among a plurality of radio cells, said PSs being capable of communicating with a CS which manages the PSs through radio links, each of said PSs having a particular LAN identifier, and maintaining the LAN identifier of the counterpart PS, each of said CSs managing a plurality of PBX telephone numbers, having a particular radio cell which defines a territory in which it is capable of communicating through radio links, monitoring of the reception levels of communication links during transmission, disconnecting a communication link if a reception level of radio waves falls to or below a predetermined threshold value, registering the LAN identifiers of said plurality of PSs which are positioned in its territory, and assigning one of said PBX telephone numbers to each of them respectively, said method comprising the steps of:

(a) connecting the communication link between a first PS within a radio cell of a first CS and a second PS within a radio cell of a second CS;

(b) instantly disconnecting said communication link if the first PS moves beyond the radio cell of the first CS and the reception level of radio waves falls to or below said predetermined threshold value, (c) registering the LAN identifier of the first PS in a third CS, and simultaneously newly assigning a PBX telephone number to the first PS when the first PS moves to the radio cell of the third CS, (d) sending by the first PS of moving information having the LAN identifier of the second PS and said newly assigned PBX telephone number through radio links to the third CS, (e) sending by the third CS of said sent moving information via the LAN to the send CS, (f) sending by the second CS of said sent moving information by radio signal to the second PS, (g) dialing by the second PS of the PBX telephone number within said sent moving information, and (h) calling the first PS in response to said dialing step, and then reconnecting the PBX telephone link between the first PS and the second PS in response to said calling.

* * * * *